July 15, 1930.    W. K. FYDA    1,770,689
MANIFOLD HEAT CONTROL
Filed July 7, 1927    2 Sheets-Sheet 1

INVENTOR.
Walter K. Fyda.
BY
ATTORNEY.

July 15, 1930. W. K. FYDA 1,770,689
MANIFOLD HEAT CONTROL
Filed July 7, 1927 2 Sheets-Sheet 2
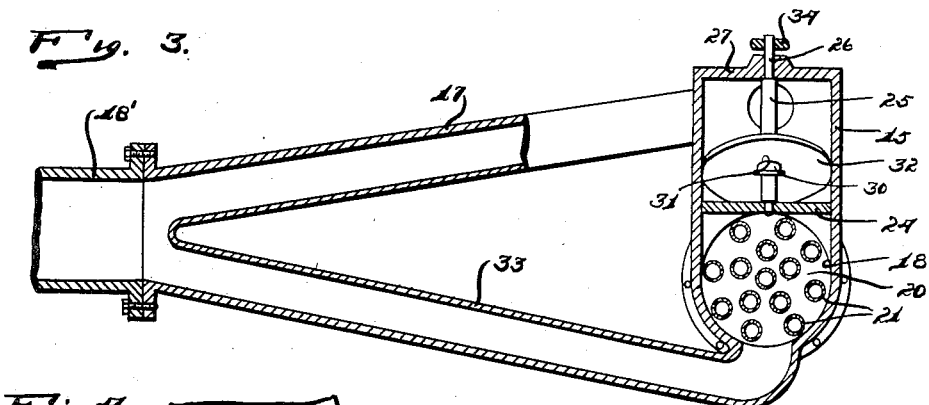
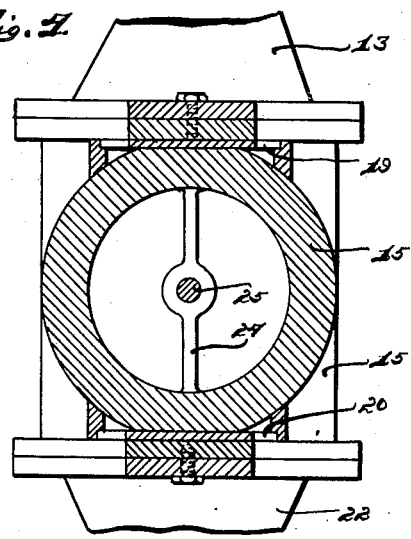
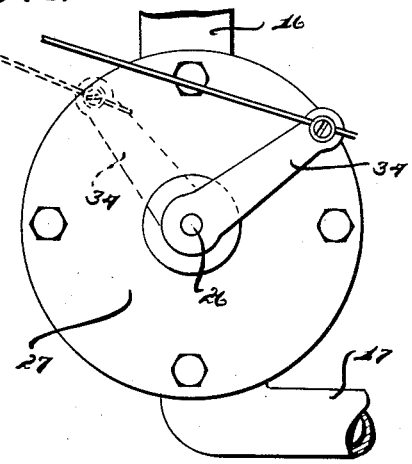
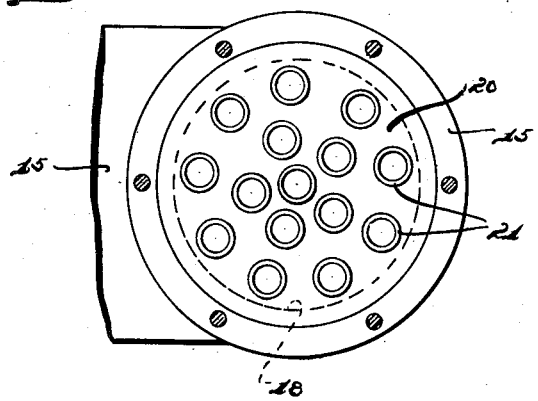
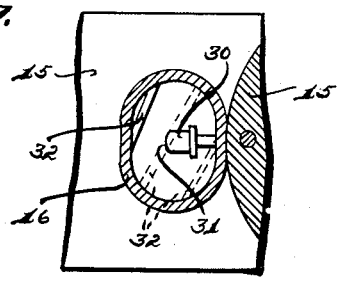
INVENTOR.
Walter K. Fyda.
BY
ATTORNEY.

Patented July 15, 1930

1,770,689

UNITED STATES PATENT OFFICE

WALTER K. FYDA, OF HAMTRAMCK, MICHIGAN

MANIFOLD HEAT CONTROL

Application filed July 7, 1927. Serial No. 203,966.

My invention relates to a new and useful improvement in a quick action super-heated manifold adapted for use on internal combustion engines, and particularly that type in which a carburetor is used for mixing the air with the fuel, although from the description of the invention it is believed evident that the device may be used on other types of engines in which combustible fuel is fed to the engine, the super-heating manifold serving to raise the temperature of the fuel and assist vaporization of the same.

It is an object of the invention to provide a device which will be simple in structure, economical of manufacture and highly efficient in use.

Another object of the invention is the provision of a device of this kind in which the exhaust gases of the engine may be led into a heating chamber through which the incoming fuel is led for the purpose of raising the temperature of the same.

Another object of the invention is the provision in a device of this kind of a control mechanism whereby the amount of exhaust gases utilized for preheating purposes may be easily and quickly determined.

Other objects will appear hereinafter.

The invention consists in the combination and arrangement of parts hereinafter described and claimed.

The invention will be best understood by a reference to the accompanying drawings which form a part of this specification and in which Fig. 1 is a side elevational view of the invention applied to an engine.

Fig. 3 is a sectional view taken on line 3—3 of Fig. 2.

Fig. 4 is a fragmentary sectional view taken on line 4—4 of Fig. 2.

Fig. 5 is an end elevational view of the invention.

Fig. 6 is a fragmentary sectional view of the invention taken on line 6—6 of Fig. 2.

Fig. 7 is a fragmentary view taken on line 7—7 of Fig. 2.

Figure 1:
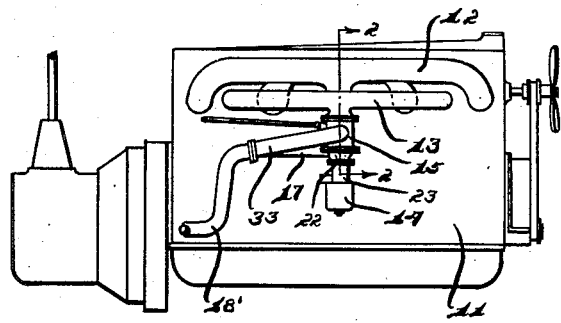

In the drawings I have illustrated the invention mounted for use with an internal combustion engine 11 having an exhaust manifold 12, an intake manifold 13 and a carburetor 14. The invention comprises a housing 15 having a neck 16 adapted for communication with the exhaust manifold 12. Communicating with the housing 15 is an outlet pipe 17 which is adapted to communicate with the exhaust pipe 18'. Communicating with the housing 15 is a chamber 18 closed at its upper end by the plate 19 and at its lower end by the plate 20. Projected through these plates 19 and 20 are pipes 21 which serve as flues for conducting the fuel flowing into the entry neck 22 through the fuel delivery pipe 23 into the intake manifold 13. Extending transversely of the housing 15 is a rib 24 in which is journalled one end of the shaft 25, the other end 26 being reduced and projected through and journalled in the end wall or cap 27 which serves as a closure for the end of the housing 15. Fixedly mounted on the shaft 25 is a collar 28 having a beveled end 29 cooperating with a similar collar 30 having the beveled end 31, and positioned on the shaft 25 between these collars is a disc 32 adapted to control communication of the outlet pipe 17 with the exhaust manifold 12. Communicating with the chamber 18 is an outlet pipe 33.

Figure 2:
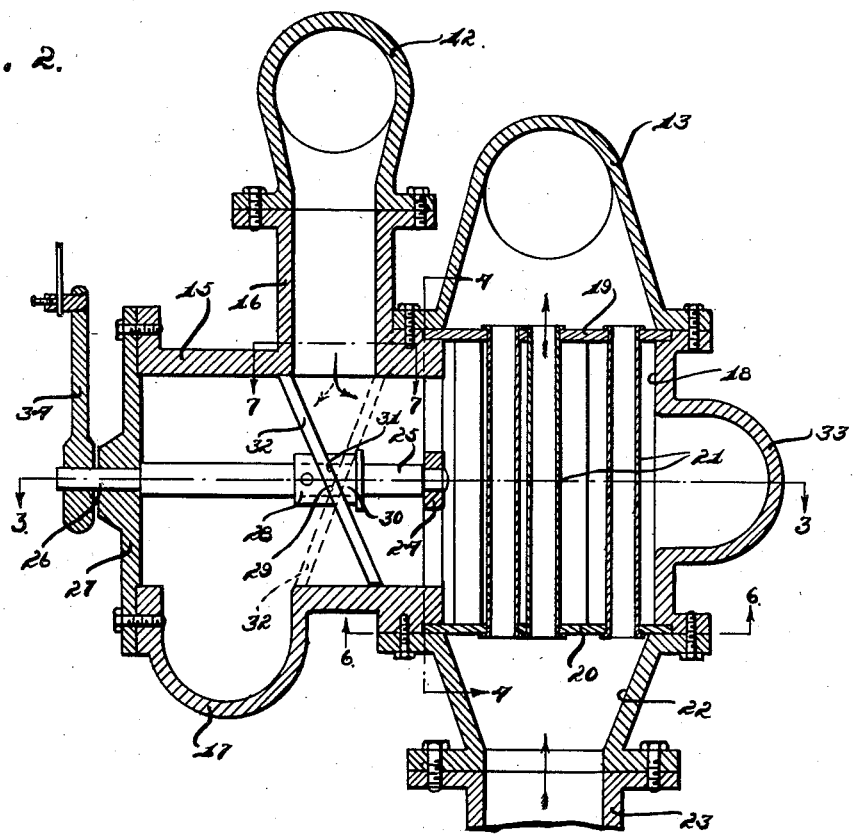
Fig. 2 is a sectional view taken on line 2—2 of Fig. 1.

In construction when the device is interposed between the carburetor 14 and the intake manifold 13 so that the fuel passing from the carburetor 14 will be projected through the flues 21, a rotation of the shaft 25 by means of the crank 34 will serve to control the flow of the exhaust gases after passage through the neck 16. When the shaft 25 is turned in one position the disc or closure 32 will be in the position shown in full lines in Fig. 2, thus forcing the exhaust gases to travel around the tubes 21 in the chamber or compartment 18, and outwardly through the outlet pipe 33 into the exhaust pipe 18', thus causing a heating of the gases and obtaining the results desired, particularly in efficiency of the engine resulting from the raise in temperature of the gases. When the shaft 25 is turned to another position, the disc or closure 32 will be in the position shown in dotted lines in Fig. 2, thus causing the exhaust gases emitting from the neck 16 to pass outwardly through the outlet pipe 17 and in no manner, affecting the gases or fuel delivered through the tubes 21. As shown clearly in Fig. 7 the shaft 25 may be turned to any desired position so that a part only of the exhaust gases may be directed into the chamber 18 and around the tubes 21, thus affording a means for adjusting the control and directing the amount of fuel desired into the chamber or compartment 18. In this manner, the device may be used even in warm weather as the amount of heating may be regulated and adjusted to a fine degree.

With a device of this kind the efficiency of the engine is raised to a maximum and the combustion of the fuel is more complete, with a resultant deposit of less carbon in the cylinders and a reduced cost of operation, particularly so far as the maintenance of the engine is concerned.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. In a device of the class described, a housing having an outlet pipe; a chamber carried by said housing; an auxiliary outlet pipe communicating with said chamber; an inlet port in said housing; and means for opening and closing communication of said inlet port with either of said outlet pipes.

2. In a device of the class described, a housing; an inlet port in said housing; a rotatable shaft in said housing; a pair of spaced collars carried by said shaft, each having beveled facing surfaces; and a disc mounted on said shaft between said collars adapted, upon movement of said shaft in one position, for closing communication of said inlet port with one side of said housing, and establishing communication with the other, and upon movement to another position, for establishing communication of said inlet port with said one side of said housing, and closing communication of said inlet port with said other side of said housing.

3. A device of the class described adapted for use with an internal combustion engine having an intake manifold communicating with the carburetor and an exhaust manifold, comprising: a housing communicating with said exhaust manifold, said housing having a chamber formed thereon closed at both ends; tubes projected through said ends for establishing communication between said carburetor and said intake manifold; a rotatable shaft in said housing; a pair of spaced collars carried by said shaft, each having beveled end faces; a disc loosely mounted on said shaft between said collars and engaging the beveled end faces thereof, the rotation of said shaft effecting an inclining of said disc to the axis in opposite directions, said disc upon movement to one position closing communication of said inlet port with one side of said housing and establishing communication with the other side upon movement to another position for establishing communication of said inlet port with said one side of said housing and closing communication of said inlet port with the other side of said housing.

4. A device of the class described adapted for use with an internal combustion engine having an intake manifold communicating with the carburetor and an exhaust manifold, comprising: a housing communicating with said exhaust manifold; an outlet pipe communicating with said housing; a chamber carried by said housing in communication therewith and having its ends closed; tubes projected through said ends for establishing communication between said carburetor and said intake manifold; a shaft rotatably mounted in said housing; a pair of collars fixedly mounted on said shaft, each having a beveled end face, said collars being in spaced relation; a disc mounted on said shaft between said collars and engaging the beveled faces thereof, said disc upon rotation of said shaft to one position closing communication between said exhaust manifold and said outlet pipe and establishing communication between said exhaust manifold and said chamber, and upon rotation to another position closing communication between said exhaust manifold and said chamber and opening communication between said exhaust manifold and said outlet pipe.

In testimony whereof I have signed the foregoing specification.

WALTER K. FYDA.